J. H. HILL & W. H. JAYNE.
Assignors, by mesne assignments, to said JAYNE, T. B. MOORE, J. E. BLACK & J. E. INGERSOLL.
Wire-Barbing Tool.
No. 8,306. Reissued June 25, 1878.
*Fig. 1*
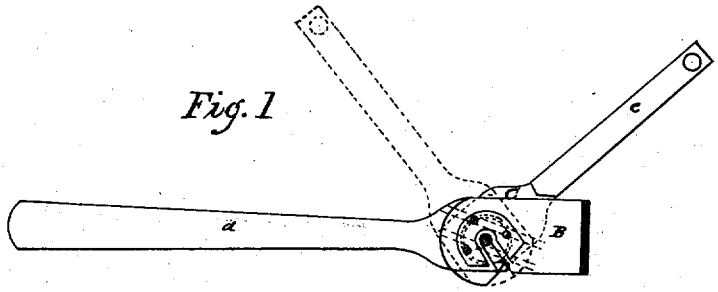
*Fig. 2*
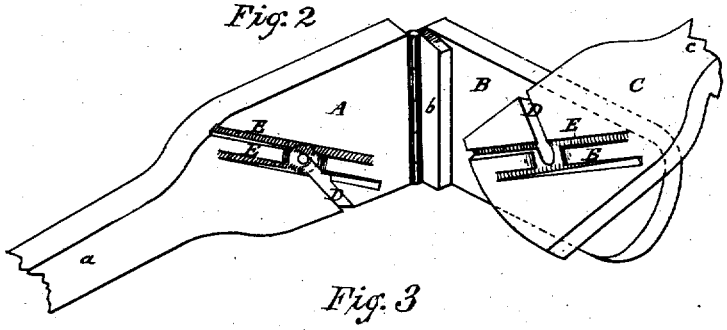
*Fig. 3*
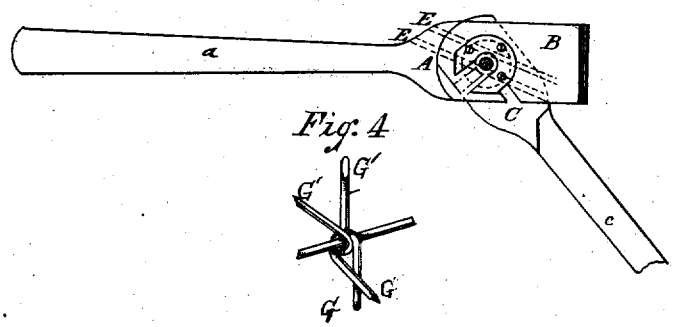
*Fig. 4*
Witnesses
G. P. Holloman
William Edgar
Inventors
James H. Hill 2d
William H. Jayne
By Sherburne & Co.
Attorneys.
N. PETERS, PHOTO-LITHOGRAPHER, WASHINGTON, D. C.

UNITED STATES PATENT OFFICE.

JAMES H. HILL AND WILLIAM H. JAYNE, OF BOONE, IOWA, ASSIGNORS, BY MESNE ASSIGNMENTS, TO SAID JAYNE, THOMAS B. MOORE, JEREMIAH E. BLACK, AND JOHN E. INGERSOLL.

IMPROVEMENT IN WIRE-BARBING TOOLS.

Specification forming part of Letters Patent No. 172,437, dated January 18, 1876; Reissue No. 8,306, dated June 25, 1878; application filed June 11, 1878.

*To all whom it may concern:*

Be it known that we, JAMES H. HILL and WILLIAM H. JAYNE, of Boone, in the county of Boone and State of Iowa, have invented certain new and useful Improvements in Wire-Fence-Barb-Forming Tools; and we do hereby declare the following to be a full, clear, and exact description thereof, which will enable others skilled in the art to which our invention appertains to make and use the same, reference being had to the accompanying drawing, forming part of this specification, in which—

Figure 1 represents a side view of a barb-forming tool embodying our invention, showing in full lines the relative position of the parts when applied to the fence-wire. Fig. 2 represents a perspective view of the same, opened to show the grooves into which the wires forming the barbs are placed preparatory to wrapping them about the fence-wire. Fig. 3 is a side view of the same, the parts being shown in position to receive the wires from which the barbs are formed; and Fig. 4 is a perspective view of a piece of fence-wire with barbs attached.

Like letters of reference indicate like parts.

The object of our invention is to provide a tool for bending four-pointed barbs, and securing the same to and upon the fence-wire by one and the same operation, and so that the two pieces of wire from which the barbs are formed will be bent around the fence-wire and across each other by a rotary movement of one of the parts of the tool.

To that end our invention consists in the arrangement of parts whereby said object is attained, as hereinafter described and claimed.

In the drawing, A represents a forming-block, which is provided at one end with a handle, *a*, for holding the same in position upon the fence-wire. B is a supporting-block, which is hinged to the end of the forming-block, so as to admit of being opened or closed at will, and is provided with a flange or cleat, *b*, located at its end adjacent to the hinge, and so arranged as to hold the blocks A B a slight distance apart when brought into a position parallel with each other. C is the movable forming-block, which is pivoted at a point near one end to the supporting-block, so as to admit of a rotary movement upon the pivot, and is provided at its end opposite to the pivot with a handle, *c*, and is so arranged upon the block B as to rest against the face of the block A when the blocks A B are brought to a position parallel with each other. D represents inclined slots, which extend from the edge of the respective blocks A B C inward toward their centers, and so that when the block C is adjusted to bring its face against the face of the block A the slots D will extend to and slightly past the center of the pivot connecting the block C to the block B. The object of these slots is to allow the tool to be adjusted to a working position upon the fence-wire by passing the latter through the slots, and the arrangement of the slots is such that the block C can be turned freely upon the wire.

The adjacent faces of the blocks A C are each provided with two parallel grooves, E E, formed therein and on opposite sides of the axis of the said blocks, to receive the wires from which the barbs are formed. The grooves E E in each of said blocks are made deep at their alternate ends, and gradually become shallower, so that they vanish at their other ends, as shown in Fig. 2. The arrangement of these grooves is such that when the block C is turned to the position shown in Fig. 3 each groove in one block will be in the same plane with its corresponding groove in the other block, and the deep end of each of the grooves in the block C will be opposite the shallow end of the corresponding grooves in the block A, so that the wires from which the barbs are formed, when inserted in the grooves, will each have one end embedded in the block A and the other end in the block C.

The operation of our invention is as follows: The tool having been properly adjusted upon the fence-wire, so that the face of the block C will rest against the face of the block A, and the block C turned upon the wire so that the grooves E E in one block will be in the same plane with the grooves E E in the other block, the wires from which the barbs are formed are then inserted in the said grooves E E, and a rotary movement imparted to the block C, by which movement of the block C the barb-wires are drawn across each other and around the fence-wire, thus forming a four-pointed barb, as shown in Fig. 4.

By this construction the barbs will be firmly twisted around each other and around the fence-wire, so that they will remain securely in place, and will not be liable to be knocked off said fence-wire or out of place upon it.

Having thus described our invention, we claim as new and desire to secure by Letters Patent—

1. The combination, in a barb-forming tool, of the two blocks A C, one of said blocks pivoted to revolve, and each provided with the tapering grooves E E, as and for the purpose specified.

2. The combination, in a barb-forming tool, of the two blocks A C, one of said blocks pivoted to revolve, and each provided with the tapering grooves E E and slot D, to receive the fence-wire, as and for the purpose specified.

3. The combination of the hinged blocks A B and the pivoted block C, provided with the handles *a′ c′*, the slots D, and the tapering grooves E E with each other, substantially as herein shown and described.

JAMES H. HILL.
WILLIAM H. JAYNE.

Witnesses:
ARTHUR L. WARRICK,
LORAN W. REYNOLDS.